Dec. 21, 1965  L. I. FREEDMAN ETAL  3,224,743
MULTIPURPOSE DOMESTIC APPLIANCE
Filed Nov. 16, 1961  9 Sheets-Sheet 1

INVENTORS
Lawrence I. Freedman
John W. Tone
Heinz Werner
BY Connolly and Hutz
ATTORNEYS Dec. 21, 1965   L. I. FREEDMAN ETAL   3,224,743
MULTIPURPOSE DOMESTIC APPLIANCE
Filed Nov. 16, 1961   9 Sheets-Sheet 4

INVENTORS
Lawrence I. Freedman
John W. Tone
Heinz Werner
BY Connolly and Hutz
ATTORNEYS Dec. 21, 1965    L. I. FREEDMAN ETAL    3,224,743
MULTIPURPOSE DOMESTIC APPLIANCE
Filed Nov. 16, 1961    9 Sheets-Sheet 5

Fig.7.

INVENTORS
Lawrence I. Freedman
John W. Tone
Heinz Werner
BY Connolly and Hutz
ATTORNEYS Dec. 21, 1965   L. I. FREEDMAN ETAL   3,224,743
MULTIPURPOSE DOMESTIC APPLIANCE
Filed Nov. 16, 1961   9 Sheets-Sheet 6

Fig. 8.

INVENTORS
Lawrence I. Freedman
John W. Tone
Heinz Werner
BY Connolly and Hutz
ATTORNEYS Dec. 21, 1965   L. I. FREEDMAN ETAL   3,224,743
MULTIPURPOSE DOMESTIC APPLIANCE
Filed Nov. 16, 1961   9 Sheets-Sheet 7

Fig. 9-10.

INVENTORS
Lawrence I. Freedman
John W. Tone
Heinz Werner
BY Connolly and Hutz
ATTORNEYS

United States Patent Office 3,224,743
Patented Dec. 21, 1965

3,224,743
MULTIPURPOSE DOMESTIC APPLIANCE
Lawrence I. Freedman, Graylyn Crest, Wilmington, John W. Tone and Heinz Werner, Wilmington, Del., assignors to Ronson Corporation, Woodbridge, N.J., a corporation of New Jersey
Filed Nov. 16, 1961, Ser. No. 152,872
16 Claims. (Cl. 259—85)

This invention relates to a multipurpose domestic appliance, which is basically a domestic mixer with provisions for connecting and operating various auxiliary attachments; and it more particularly relates to a structure for such an appliance which facilitates its alternate mounting within or on a kitchen counter.

Various multipurpose domestic appliances have been basically constructed in the form of mixers with provisions for driving a variety of attachments for performing different household functions such as: squeezing citrus fruits, grinding meat and other foods, shredding vegetables, grinding coffee and the like. The structures of heretofore existing units has made it difficult to alternately accommodate them within a counter surface or use them in a portable form upon a counter.

An object of this invention is to provide a multipurpose domestic appliance having a compact structure which facilitates alternate on-counter or disappearing flush counter installations.

Another object is to provide a compact form of such an appliance which occupies a minimum of space either on counter or over a counter.

In accordance with this invention a multipurpose domestic appliance is fundamentally made in the form of a hollow casing including a base and pedestal of substantially equal width with communicating hollow interiors. A variable speed motor within the casing drives a power take-off coupling or socket which is vertically mounted in the base remote from the pedestal, and a beater arm is rotatably mounted upon a horizontal axis of rotation at the top of the pedestal which permits it to be adjusted to various operative and retracted positions. This provides a remarkably compact basic unit which can be alternatively utilized as a mixer of the power-driven bowl type when the beater arm is positioned horizontally above the base and which is conveniently adapted for operating various power-driven attachments from the power take-off socket when the beater arm is retracted out of the way.

The rear surface of the pedestal may be made substantially flat and smooth for concealing the well in a counter when the back of the unit is pivoted flush with the counter at a point which is substantially equidistant from the top of the pedestal and the front of the base. A simple 90° rotation accordingly transfers the unit from concealed to operating positions. The undercounter space required for the well is minimized by retracting the rotatable beater arm closely adjacent the pedestal which permits the depth of the well to be governed by the distance of the front of the base to the pivot. The beater arm may also be inclined upwardly for disengaging the beater from the bowl and for allowing drippings to fall into the bowl before it is removed.

A convenient and space saving driving arrangement for such a unit includes a vertically mounted motor extending between the communicating interiors of the base and pedestal. This motor is connected to the power take-off socket and to a power-driven beater-receiving socket in the end of the beater arm. The power-driven beater cooperates with a counter-rotating power-driven bowl, and a clutch is provided in the auxiliary transmission to the beater, which is interlocked with a latching device to prevent transfer of the beater arm from one position to the other unless the clutch is disengaged.

A convenient device for locking various attachments to the power take-off socket includes a control knob in the side of the pedestal connected to a parallelogram linkage which inserts and retracts locking bars through slots in the socket. The unit may also be conveniently prepared for on counter use by inserting it within an outer shell including a decorative base and a rear plate. One basic unit may therefore be mounted either within or on a kitchen counter, with a minimum expense and trouble to convert from one form of mounting to the other.

Novel features and advantages of the present invention will become apparent to one skilled in the art from a reading of the following description in conjunction with the accompanying drawings wherein similar reference characters refer to similar parts and in which:

FIG. 9 is the top portion of a cross sectional side view in elevation of an embodiment of this invention substantially similar to that shown in FIG. 1;

FIG. 10 is the bottom portion of the cross sectional side view in elevation shown in FIG. 9;

Figure 1:
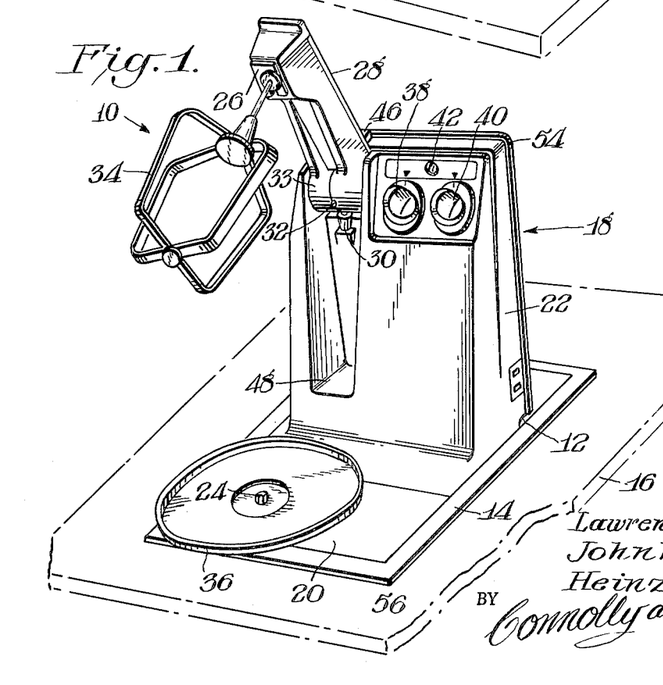
FIG. 1 is a perspective view of one embodiment of this invention mounted within a counter.

In FIG. 1 is shown a multipurpose appliance 10 which is rotatably mounted by pivot means 12 for disappearing flush mounting within well 14 in counter 16. Unit 10 includes a hollow casing 18 incorporating a base 20 (later described in detail) and a pedestal 22 with communicating hollow interiors. A pair of concentric power take-off shafts 24 and 25 (not shown in FIG. 1) are rotated by later described electric motor within casing 18. Shaft 24 is a high speed shaft for providing a power take-off for an attachment such as a blender and various high-speed attachments, and shaft 25 (not shown) is a slow speed shaft suitable for providing a power take-off for rotating a mixing bowl and various slow-speed attachments. The motor also drives a beater rotating socket 26 mounted in the end of rotatable beater arm 28, which is illustrated in an upwardly inclined position in FIG. 1. Arm 28 is maintained locked in its various positions by engagement of detent pin 30 within one of a series of holes 32 in the base 33 of beater arm 28. In FIG. 1 beater 34 inserted within socket 26 is maintained in an upwardly inclined position above turntable 36 which is rotatably mounted upon power take-off shaft 25 to dispose the unit in condition for receiving a mixing bowl. A series of controls including speed selector knob 38 with built-in on-off switch (not shown) and timer 40 together with toggle switch 42 are conveniently mounted upon an upper portion of pedestal 22 to one side of beater arm 28 which is accordingly displaced to one side of pedestal 22. Toggle switch 42 provides a means for switching from timed to manual operations.

Figure 2:
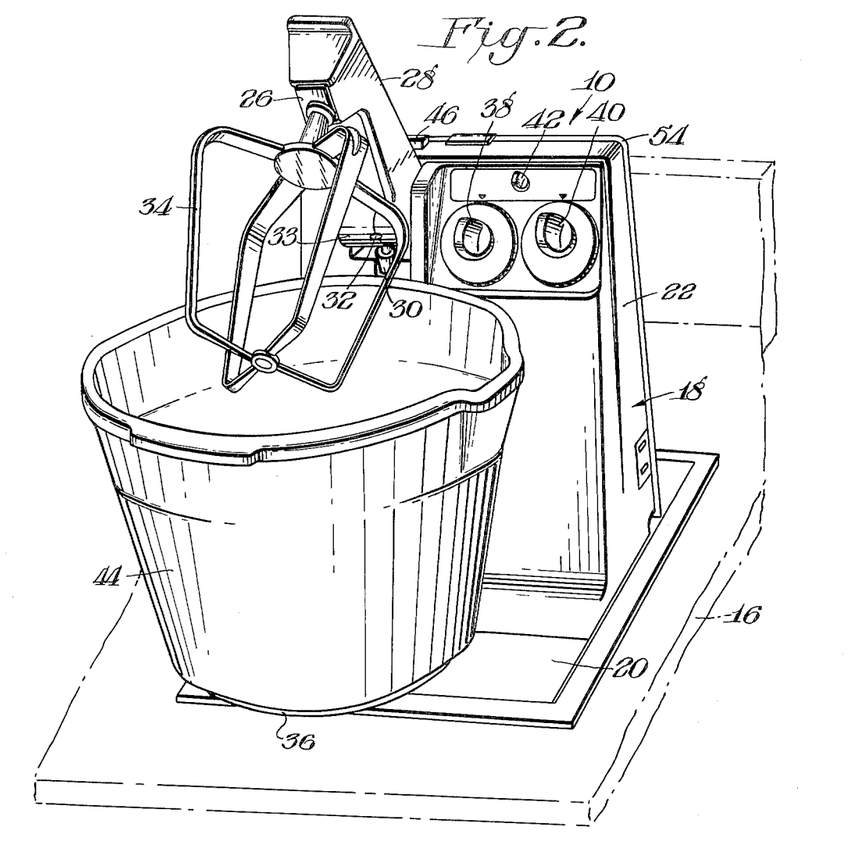
FIG. 2 is a perspective view of the embodiment shown in FIG. 1 with a bowl mounted upon its turntable.
Figure 3:
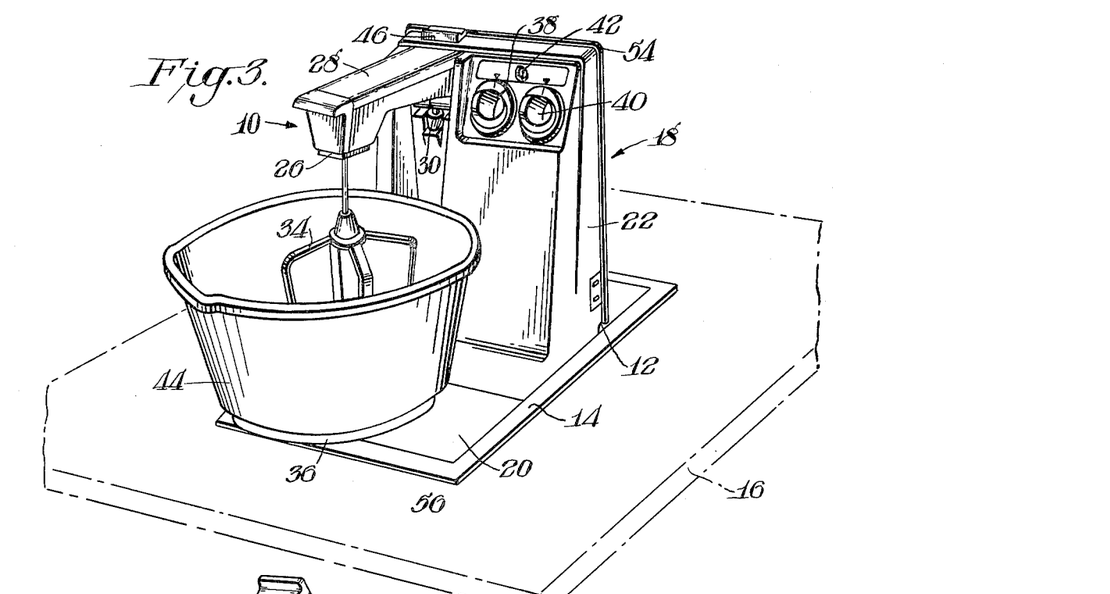
FIG. 3 is a perspective view of the embodiment shown in FIG. 1 in position for mixing.

In FIG. 2 a mixing bowl 44 is mounted upon turntable 36 in position for allowing beater 34 to be lowered into it. In FIG. 3 beater 34 has been lowered into bowl 44 by downward rotation of beater arm 28 into its substantially horizontal position. Prior to transfer of arm 28, release button 46 is operated for releasing detent pin 30 from one of holes 32 which also releases a clutch to the beater socket 26 driving mechanism, which is later described in detail. Release button 46 is connected to both the detent mechanism and the clutch to provide an interlock which prevents engagement or disengagement of the clutch while arm 28 is being rotated.

Figure 4:
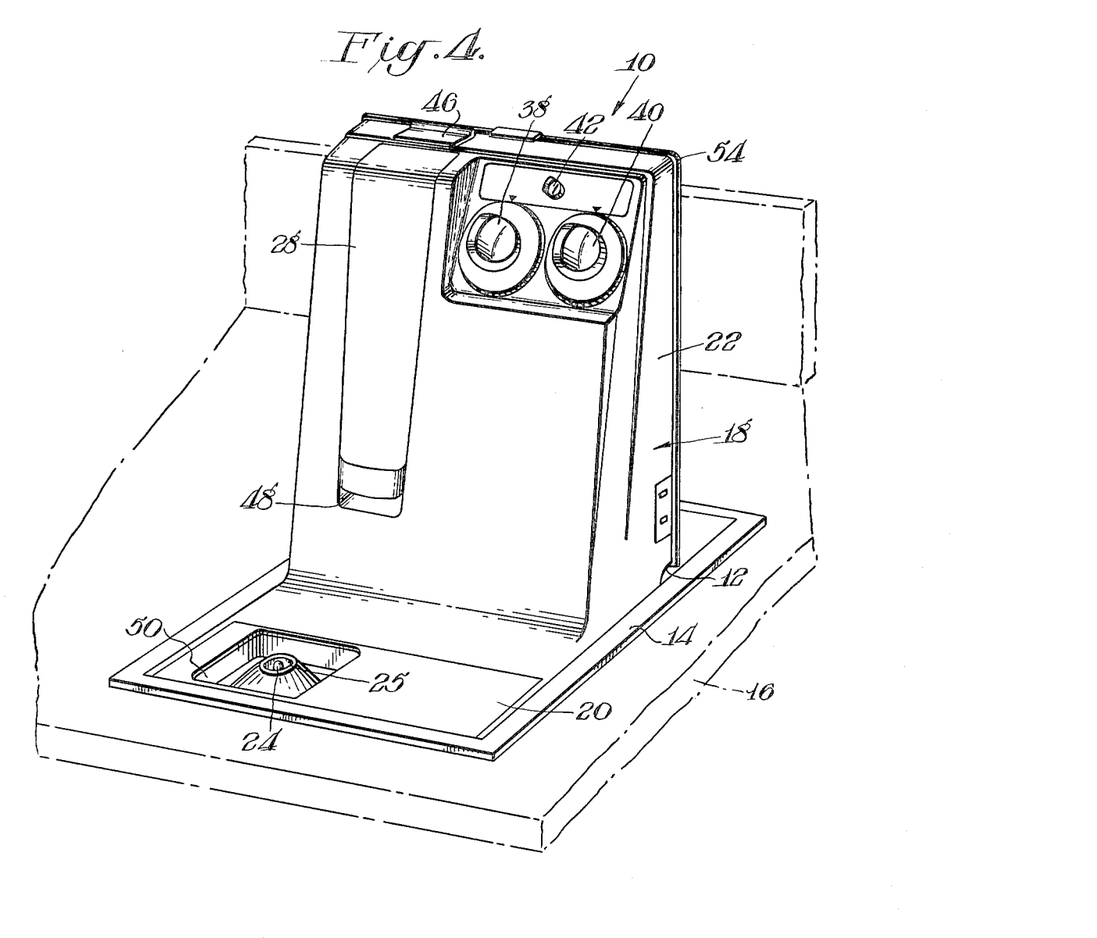
FIG. 4 is a perspective view of the embodiment shown in FIG. 1 with beater arm retracted and power take-off socket exposed for connection to various attachments.

FIG. 4 shows beater arm 28 rotated downwardly into the fully retracted position in which it is smoothly accommodated within a recess 48 in casing 18. In this position various attachments can be connected into socket 50 for connection to power take-off shafts 24 and 25. A means for locking these attachments within socket 50 is later described in detail.

Figure 5:
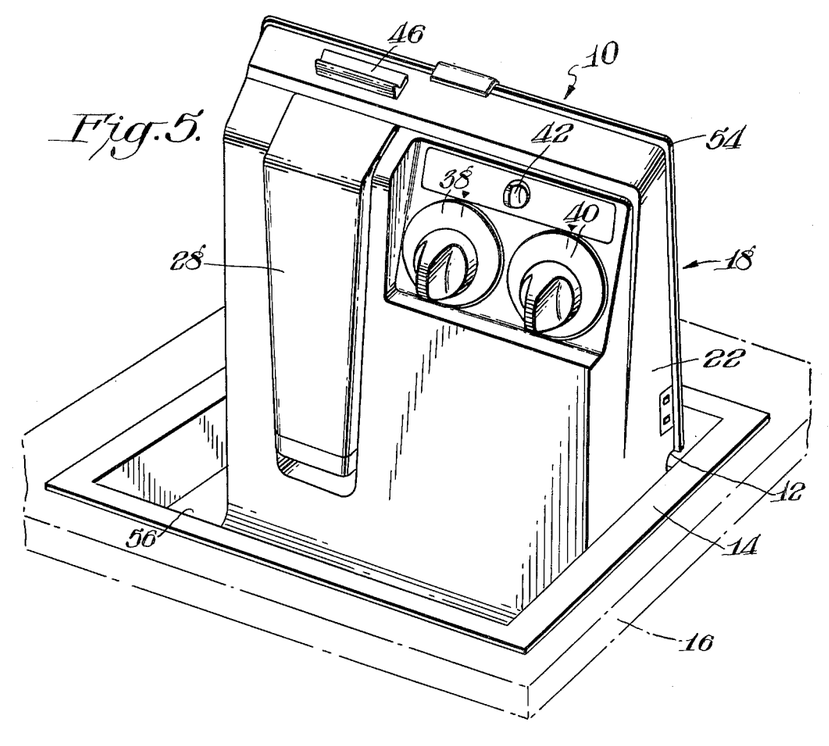
FIG. 5 is a perspective view of the embodiment of FIG. 4 being rotated towards its flush position.
Figure 6:
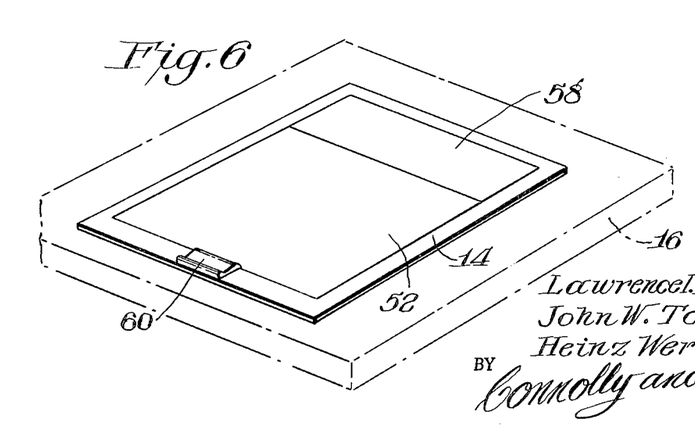
FIG. 6 is a perspective view of the top of a counter incorporating an inwardly rotated embodiment of the type shown in FIGS. 1–5.

FIG. 5 shows unit 10 in an intermediate position through which it is rotated flush with the counter as shown in FIG. 6 to form smooth cover 52 for well 14. Cover 52 is formed by the relatively smooth back of pedestal 22, and it provides a convenient cover for well 14 because the top edge 54 of pedestal 22 is substantially equidistant from pivot means 12 with the front edge 56 of base 20. An auxiliary plate 58 covers the rear of well 14 under which the back of base 20 is received to prevent any opening from being presented when the unit is in the upright position shown in FIGS. 1–4. A convenient knob 60 may be provided for raising the unit, or this can be accomplished by some flush means to avoid any above-counter projections.

Figure 7:
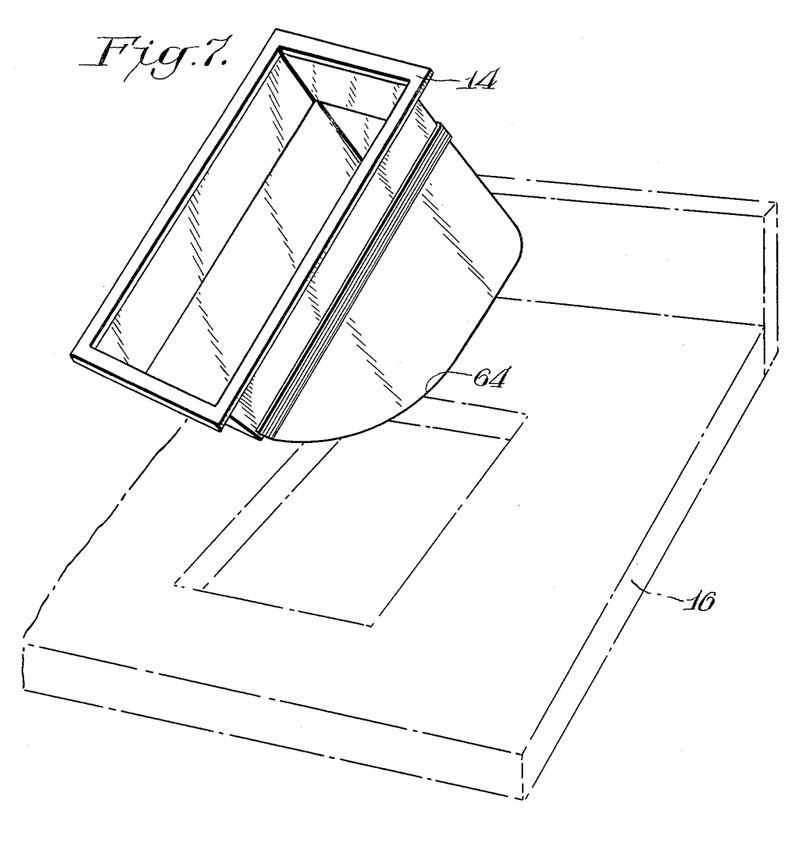
FIG. 7 is a perspective view on the well for receiving the embodiments of FIGS. 1–5 and a hole in a counter for accommodating this well.

In FIG. 7 is shown the overall appearance of well 14 including its curved bottom 64 which closely accommodates the path of travel of the front edge of base 20 to minimize the under-counter space required by well 14. The retraction of beater arm 28 closely adjacent pedestal 22 shown in FIG. 4 minimizes the under-counter space required as well as facilitating the installation of various attachments in power take-off socket 50.

Figure 8:
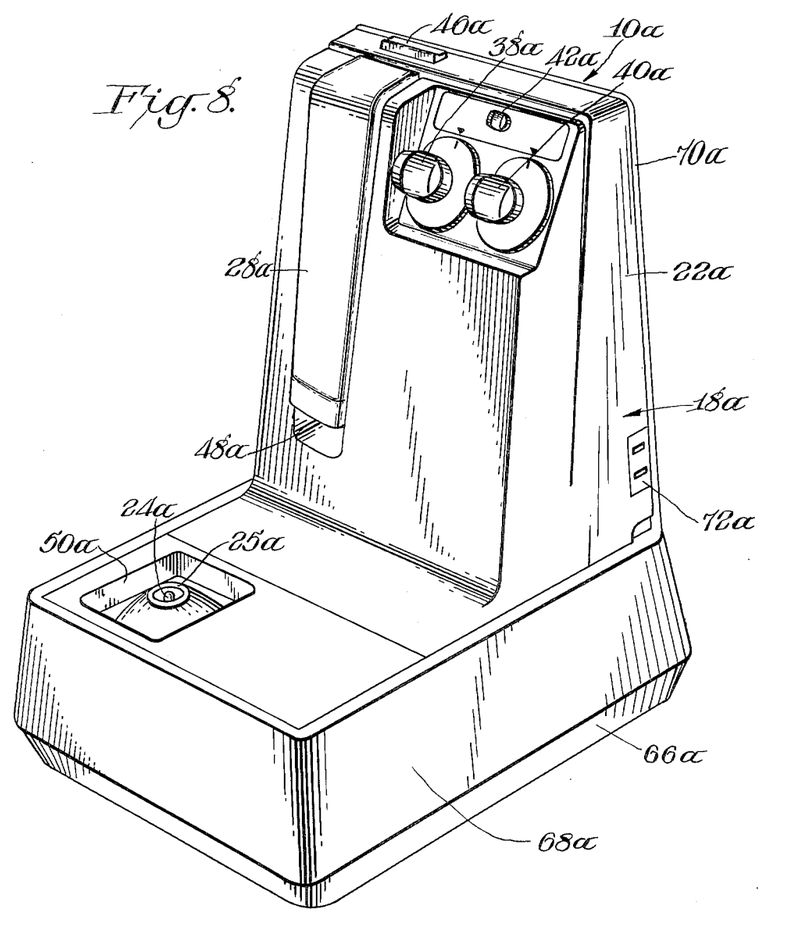
FIG. 8 is a perspective view of an embodiment of this invention for on counter use.

In FIG. 8 is shown an on-counter adaptation 10a of the embodiment shown in FIGS. 1–4 in which casing 18a is nested within an attractive shell 66a including a hollow base 68a and rear plate 70a. A convenient electrical outlet 72a is also included in unit 10 as shown in FIG. 8. This unit may accordingly be conveniently converted for mounting within counter or on counter with a minimum of trouble and expense by merely exchanging a hinge means for an outer shell for attractively housing it.

Details of interior and operative portions of the units shown in FIGS. 1–8 are shown in FIGS. 9–13. In some respects some portions of the units shown in FIGS. 1–8 are slightly modified in FIGS. 9–13 and specific reference is made only to these modifications.

As shown in FIGS. 9 and 10, unit 10b includes a variable speed electric motor 74b which is conveniently mounted to extend through the communicating interiors of pedestal 22b and base 20b. Motor 74b includes a vertically disposed shaft 76b which facilitates the power drive through spur gear transmission 78b to power take-off shafts 24b and 25b and through auxiliary spur gear transmission 80b (shown in FIG. 11) to beater socket 26b.

As shown in FIG. 9, auxiliary transmission 80b includes a vertical shaft 82b extending from base 20b into pedestal 22b through bearing 84b which is connected to bottom half 86b of clutch 88b. Compression spring 90b urges bottom half 86b of clutch 88b into the engaged condition. Upper clutch half 92b is pinned to shaft 94b, which is connected by spur gear train 96b to rotate beater socket 26b within which beater shaft 98b is detachably inserted in a conventional manner. A convenient beater ejector 100b facilitates the removal of beater 34b upon its downward movement.

Figure 11:
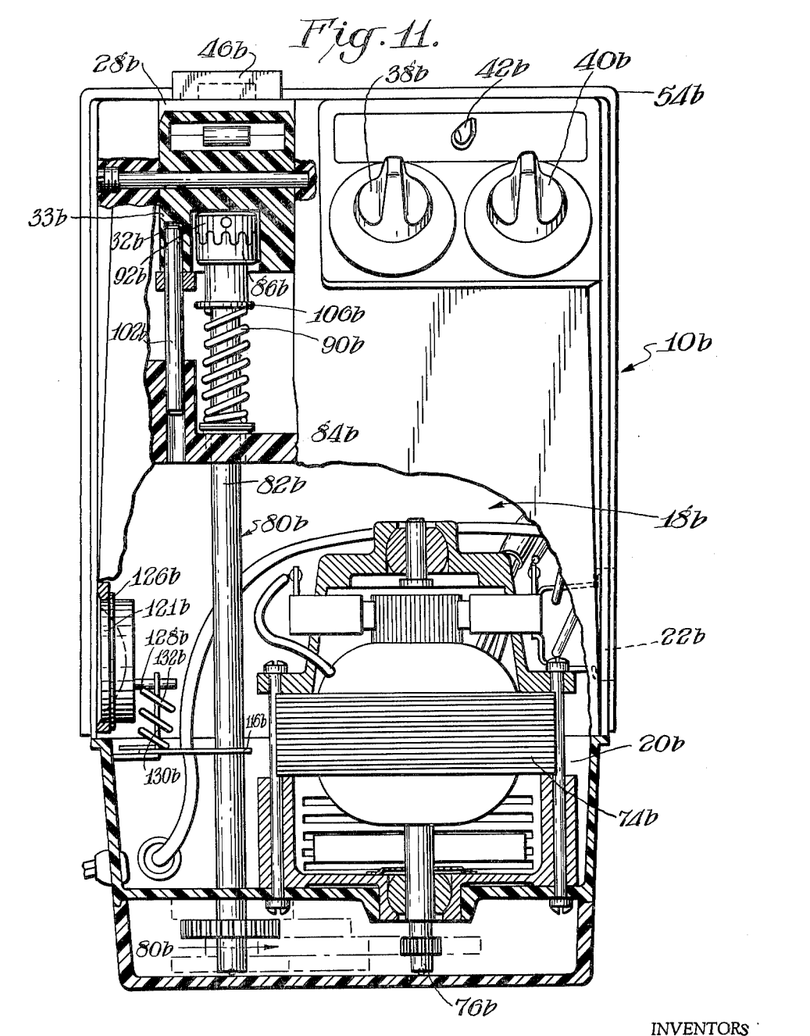
FIG. 11 is a cross sectional view taken through FIGS. 9 and 10 along the line 11—11.

Release button 46b at the rear of beater arm 28b is connected both to clutch 88b and detent pin 102b shown in FIG. 11 by angular rod 104b shown in FIG. 9 which is engaged with flange 106b of lower clutch half 86b and to detent pin 102b shown in FIG. 11. Clutch 88b has a shorter path of disengaging travel than detent pin 102b and holes 32b in the base 33b of beater arm 28b to insure that clutch 88b fully disengages before pin 104b clears holes 32b thereby insuring that the clutch cannot remain engaged while arm 28b is shifted from one position to the other.

Figure 12:
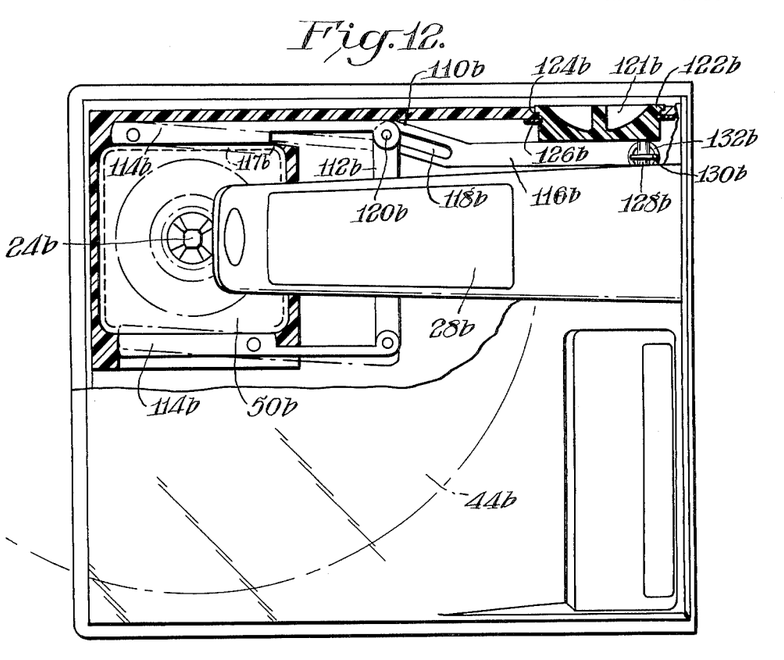
FIG. 12 is a plan view partially broken away in cross section of the embodiment shown in FIGS. 9–11.

In FIG. 10 is shown the mounting of power take-off shafts 24b and 25b within power take-off socket 50b of rectangular plan as shown in FIG. 12. Turntable 36b is shown in FIG. 10 mounted upon and engaged with the opened top of annular power take-off shaft 25b, and bowl 44b is mounted upon turntable 36b. In this arrangement bowl 44b and beater 34b are rotated in opposite directions to provide thorough mixing throughout all portions of the bowl, and the contact of lower bearing 108b of beater 34b with the bottom of bowl 44b firmly maintains it locked in position. This arrangement accordingly provides secure, dependable and thorough mixing of all portions of a substance contained in bowl 44b.

When turntable 36b is removed from bushing 51b and beater arm 28b is rotated into its retracted position closely adjacent pedestal 28b as shown in FIG. 4 various attachments having bases shaped for accommodation in socket 50b may be inserted and locked therein with their input shafts or couplings engaged with power take-off shafts 24b and 25b. These attachments include for example a blender, meat grinder, vegetable shredder and coffee grinder. The bases of these units are for example made with square exteriors and truncated conical interiors for engagement with socket 50b.

Figure 13:
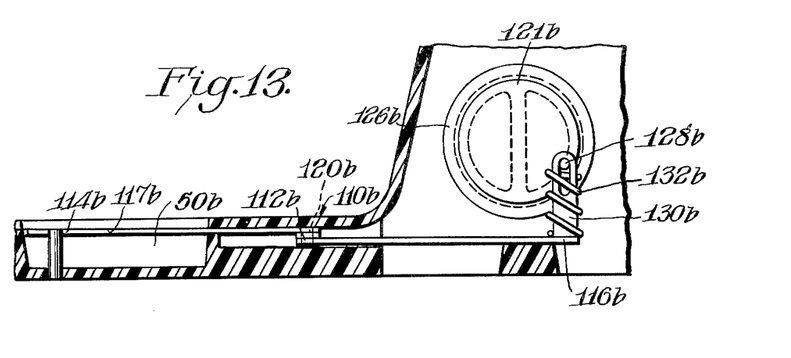
FIG. 13 is a cross sectional view taken through the portion of the embodiment shown in FIG. 12 incorporating the socket locking linkage.

In FIGS. 12 and 13 are shown details of a convenient and space-saving arrangement 110b for locking the bases of attachments within socket 50b. Locking arrangement 110b includes a parallelogram linkage 112b incorporating a pair of locking bars 114b which extend through slots 117b in the wall of socket 50b as shown in phantom outline in FIG. 12. Parallelogram linkage 114b is actuated through a slotted link 116b having an inclined slot or cam 118b which engages pin 120b of parallelogram linkage 112b. Slotted link 116b is reciprocated back and forth by a control disc 120b which is rotatably mounted in the side wall 122b and secured therein by flange 124b and lock ring 126b. A pin 128b extends inwardly from disc 120b into engagement with a crank arm 130b rigidly secured to the upper surface of link 116b. Rotation of disc 120b and attached pin 128b accordingly transfers crank 130b and link 116b back and forth against the resilient reaction of coil spring 132b which urges locking bars 114b to the normally unlocked position shown in FIGS. 12 and 13 from the locked phantom position. Locking bars 114 are maintained in the locked position by over bottom-center rotation of pin 128b from the positioning shown in FIG. 13. This accordingly provides a highly convenient and compact locking linkage for operatively securing attachments within socket 50b.

What is claimed is:

1. A multipurpose use domestic appliance capable of use with various attachments comprising a hollow casing including a base and a pedestal, said base and pedestal having communicating hollow interiors, a variable speed motor mounted within said casing, a power shaft being mounted substantially remote from said pedestal within said base, the upper end of said power shaft being accessible through said base, a connecting means upon said power shaft for operatively connecting said attachments thereto, a coupling means on said base for mounting said attachments upon said base when connected to said power shaft, transmission means in said base connecting said variable speed motor with said power shaft for rotating it, an arm mounted upon an upper portion of said pedestal, said arm incorporating rotatable beater-connecting means, and rotatable means connecting said arm to said pedestal for permitting said arm to be disposed in various operative and retracted positions whereby said power shaft in said base may be used in conjunction with a beater connected to said arm and disposed in said operative position and independently for operating said attachments when said arm is in said retracted position.

2. An appliance as set forth in claim 1 wherein the rear surface of said pedestal is substantially flat, a pivot means being mounted adjacent said surface at a distance from the top of said pedestal substantially equal to the distance from the front end of said base to said pivot means for permitting said rear surface to cover an opening in a counter top within which said appliance is rotatably mounted by said pivot means, and said arm in said retracted position minimizing the size of said opening.

3. A multipurpose use domestic appliance for mounting on the top of a counter comprising a hollow casing including a base and a pedestal, said base and pedestal having communicating hollow interiors, a variable speed motor mounted within said casing, a power shaft being mounted substantially remote from said pedestal within said base, the upper end of said power shaft being accesible through said base, transmission means in said base connecting said variable speed motor with said power shaft for rotating it, an arm mounted upon an upper portion of said pedestal, said arm incorporating rotatable beater-connecting means, rotatable means connecting said arm to said pedestal for permitting said arm to be disposed in various operative and retracted positions, the rear surface of said pedestal being substantially flat, a pivot means being mounted adjacent said rear surface of said pedestal at a distance from the top of said pedestal substantially equal to the distance from the front end of said base to said pivot means for permitting said rear surface to cover an opening in said counter top within which said appliance is rotatably mounted by said pivot means, a well having a substantially rectangular plan for insertion in said opening in said counter top, the length of said well being substantially equal to the height of said casing from the top of said pedestal to the bottom of said base for permitting said appliance to be smoothly accommodated within said well when said appliance is rotated to dispose said rear surface of said pedestal in line with the top of said counter, cooperating pivot means in said well, and said pivot means being connected to said cooperating pivot means for rotatably mounting said appliance in said well.

4. An appliance as set forth in claim 3 wherein a blank plate covers the portion of said well extending from said pivot means to the end of said well accommodating said base when said rear surface of said appliance is flush with said counter for sealing said portion of said well.

5. An appliance as set forth in claim 3 wherein the lower surface of said well is curved to closely accommodate the path of travel of the front end of said base under said counter when said arm is folded into a said retracted position adjacent said pedestal.

6. An appliance as set forth in claim 1 wherein said arm is disposed at one side of said pedestal, and controls for said appliance are mounted upon an upper portion of said pedestal alongside said arm.

7. An appliance as set forth in claim 1 wherein said motor is mounted substantially vertically within said casing and extends within said communicating interiors of said pedestal and base, and said motor having a substantially vertical shaft for simplifying said transmission means.

8. An appliance as set forth in claim 1 wherein auxiliary transmission means connects said motor with said rotatable beater mounted means for imparting rotational movement to it.

9. An appliance as set forth in claim 8 wherein clutch means are provided in said auxiliary transmission means, latching means reacting between said arm and said pedestal for maintaining said arm located in its various positions, and interlock means connected between said latching means and said clutch means for insuring that said clutch means is disengaged whenever said beater arm is moved from one position to the other.

10. A multipurpose use domestic appliance comprising a hollow casing including a base and a pedestal, said base and pedestal having communicating hollow interiors, a variable speed motor mounted within said casing, a power shaft being mounted substantially remote from said pedestal within said base, the upper end of said power shaft being accessible through said base, transmission means in said base connecting said variable speed motor with said power shaft for rotating it, an arm mounted upon an upper portion of said pedestal, said arm incorporating rotatable beater-connecting means, rotatable means connecting said arm to said pedestal for permitting said arm to be disposed in various operative and retracted positions, auxiliary transmission means connecting said motor with said rotatable beater-connecting means for imparting rotational movement to it, clutch means being provided in said auxiliary transmission means, latching means reacting between said arm and said pedestal for maintaining said arm located in its various positions, interlock means connected between said latching means and said clutch means for insuring that said clutch means is disenaged whenever said arm is moved from one position to the other, said latching means comprising a detent pin mounted within said pedestal and a series of holes in said arm which become aligned with said detent pin in said various positions of said beater arm, and said interlocking means comprising an actuating linkage which is connected to both said clutch and detent pin for releasing said detent pin only when said clutch has been disengaged.

11. An appliance as set forth in claim 8 wherein said auxiliary transmission means includes a substantially vertical transmission shaft extending vertically through said pedestal, and said motor having a substantially vertically disposed rotating shaft for simplifying both said transmission means and said auxiliary transmission means.

12. A multipurpose use domestic appliance comprising a hollow casing including a base and a pedestal, said base and pedestal having communicating hollow interiors, a variable speed motor mounted within said casing, a power shaft being mounted substantially remote from said pedestal within said base, the upper end of said power shaft being accessible through said base, transmission means in said base connecting said variable speed motor with said power shaft for rotating it, an arm mounted upon an upper portion of said pedestal, said arm incorporating rotatable beater-connecting means, rotatable means connecting said arm to said pedestal for permitting said arm to be disposed in various operative and retracted positions, an annular well being provided about said power shaft in said base for receiving the bases of various attachments, releasable locking means being provided in the outer surface of said well, actuating means for said locking means being mounted in said pedestal, and a linkage connecting said actuating means with said locking means.

13. An appliance as set forth in claim 12 wherein said actuating means is disposed in the side of said pedestal.

14. An appliance as set forth in claim 13 wherein said locking means comprises a parallelogram linkage, pivot means mounting said parallelogram linkage within said base adjacent said well, and the sides of said well being slotted for permitting said parallelogram linkage to be inserted through said slots into engagement with an attachment disposed within said well.

15. An appliance as set forth in claim 14 wherein said parallelogram linkage includes an inclined pin and slot actuating member.

16. An appliance as set forth in claim 1 wherein an outer shell having a base and rear plate is provided for receiving said casing to provide a convenient portable form of said appliance, and said casing being inserted within said shell.

References Cited by the Examiner

UNITED STATES PATENTS

| 1,820,527 | 8/1931 | Chasow | 112—258 X |
| 2,462,089 | 2/1949 | Frisbie | 259—1 |
| 2,798,782 | 7/1957 | Appelgate | 312—30 X |

FOREIGN PATENTS

| 763,989 | 1956 | Great Britain. |
| 873,684 | 1961 | Great Britain. |

CHARLES A. WILLMUTH, *Primary Examiner.*

LEO QUACKENBUSH, *Examiner.*